United States Patent [19]

Nowak

[11] Patent Number: 5,205,376

[45] Date of Patent: Apr. 27, 1993

[54] LUBRICATING SYSTEM FOR MULTI-SPINDLE REVOLVING HEAD MECHANISM

[75] Inventor: Florian I. Nowak, Newington, Conn.

[73] Assignee: Nowak Products, Inc., Newington, Conn.

[21] Appl. No.: 896,574

[22] Filed: Jun. 10, 1992

[51] Int. Cl.⁵ .................................................. F01M 1/00
[52] U.S. Cl. ...................................... 184/6.14; 184/5; 184/6.26; 384/13; 384/322
[58] Field of Search .................. 384/13, 322; 184/5, 184/6, 6.5, 6.14, 6.26, 9, 18, 55.1

[56] References Cited

U.S. PATENT DOCUMENTS

| | | | |
|---|---|---|---|
| 1,125,031 | 1/1915 | Chace | 184/6.14 |
| 2,245,105 | 6/1941 | Johnson | 184/6.14 |
| 2,379,944 | 7/1945 | Willmott | 184/6.14 |
| 2,625,448 | 1/1953 | Underwood | 184/6.5 |
| 2,728,414 | 12/1955 | Drissner | 184/6 |
| 3,351,392 | 11/1967 | Powell | 184/5 |
| 4,068,740 | 1/1978 | Quinn et al. | 184/6 |
| 4,344,507 | 8/1982 | Osborne | 184/6 |
| 4,905,794 | 3/1990 | Sugioka et al. | 184/6.15 |

FOREIGN PATENT DOCUMENTS 0473189  4/1951  Canada ..................... 184/6

*Primary Examiner*—Richard R. Cole
*Assistant Examiner*—Alan B. Cariso
*Attorney, Agent, or Firm*—Ira S. Dorman

[57] ABSTRACT

A multiple-spindle mechanism is lubricated, and is protected against the entry of foreign matter, by a mist of oil which is distributed under pressure between mutually contacting bearing surfaces, and is discharged outwardly thereof. The mechanism is especially well suited for use in an automatic screw machine, and provides the desired functions despite the axial reciprocation of the spindles that occurs therein.

8 Claims, 3 Drawing Sheets

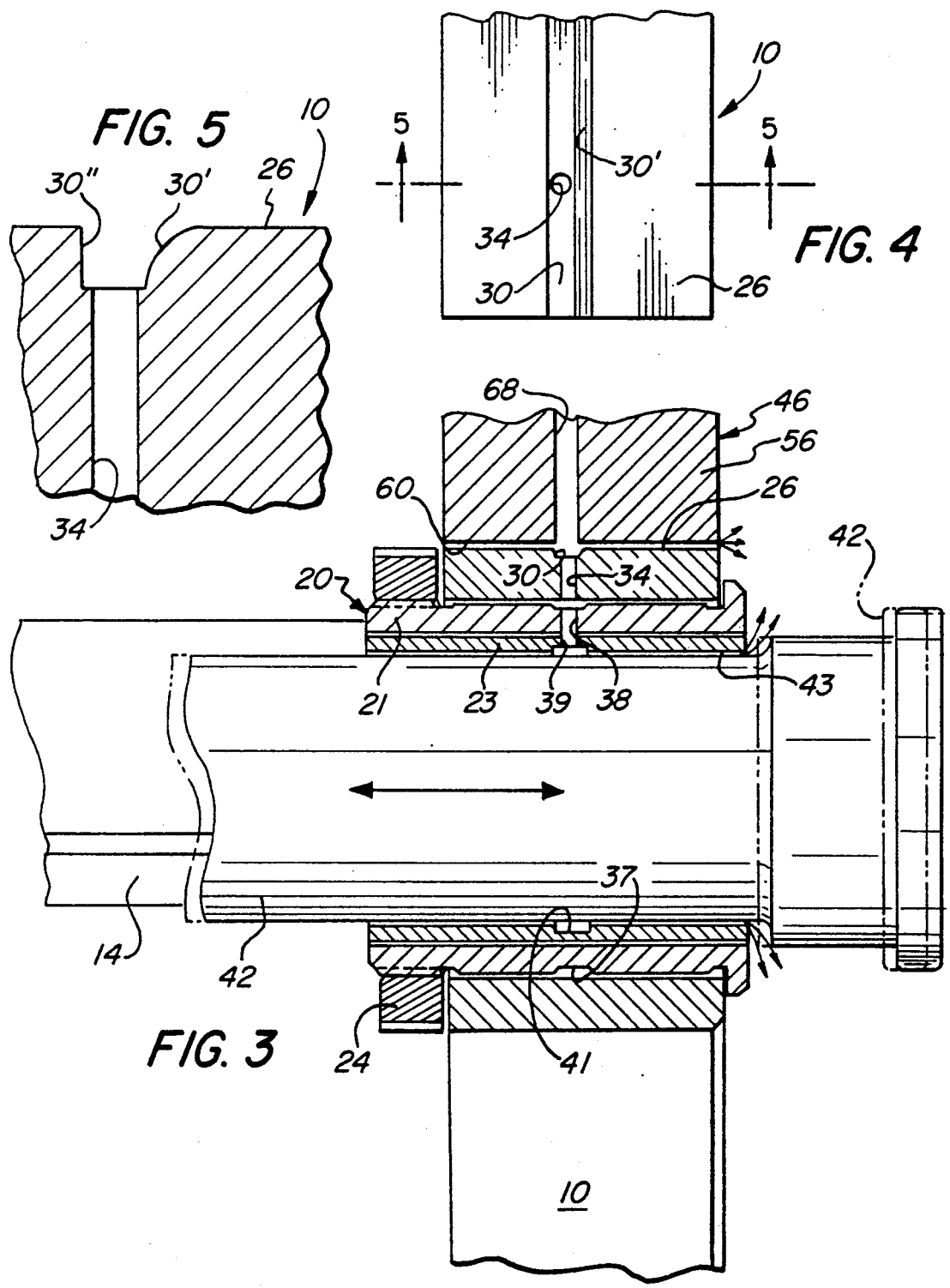

LUBRICATING SYSTEM FOR MULTI-SPINDLE REVOLVING HEAD MECHANISM

BACKGROUND OF THE INVENTION

Due to the complexity of multiple spindle mechanisms of the kind employed in automatic screw machines and the like, difficult problems of lubrication are presented. Typically, the parts are simply flooded with oil; in addition to being relatively inefficient and wasteful, however, flooding techniques require oil recovery, and normally recirculation.

Moreover, components of such mechanisms are prone to excessive wear and premature exhaustion due to the tendency for metal debris and other foreign matter to enter between mating bearing surfaces. These problems are exacerbated in mechanisms that employ axially reciprocating spindles, since such action tends to drag foreign matter into and between the mating surfaces; in the case of automatic screw machines, for example, the zone of greatest exposure is the machining station that lies in front of the several spindles. Mechanical seals have of course long been used in an effort to ameliorate such contamination, but they are known to be quite ineffective.

Drissner U.S. Pat. No. 2,728,414, issued Dec. 27, 1955, provides a lubrication system for a machine having multiple spindles, in which oil is supplied through tubes to oil sleeves, sequentially indexed into proximity with one another.

Quinn et al U.S. Pat. No. 4,068,740, issued Jan. 17, 1978, provides a gear train in which one of the gears functions as a centrifugal oil pump.

In the apparatus disclosed in Osborne U.S. Pat. No. 4,344,507, issued Aug. 17, 1982, a threaded member is used to force lubricating fluid from a reservoir through internal bores and ports to an upper bearing assembly.

Sugioka et al U.S. Pat. No. 4,905,974, issued Mar. 6, 1990, provides a system in which rotatable oil tanks are used to lubricate the bearings of a turret-type machine.

SUMMARY OF THE INVENTION

Accordingly, it is the broad object of the present invention to provide a multiple-spindle mechanism, and a machine incorporating the same, in which improved lubrication is afforded, together with concurrent sealing of mating bearing surfaces, to extend the useful life of the spindles and other components and to ensure smooth and trouble-free operation.

More specific objects of the invention are to provide such a mechanism and machine in which all of the spindles are lubricated simultaneously and continuously, in which debris and other foreign matter is effectively excluded from between the mating bearing surfaces despite axial reciprocation of the spindles and despite the absence of mechanical seals, and in which the need for making major overhauls and repairs is greatly reduced.

Additional objects are to provide such a mechanism and machine in which oil flooding, and the need for recovery and recirculation of oil, are obviated.

Yet additional objects of the invention are to provide a mechanism having the foregoing features and advantages, which is of relatively incomplex design and is especially well suited for use in a multiple-spindle automatic screw machine.

It has now been found that certain of the foregoing and related objects of the invention are attained in a multi-spindle mechanism, improved by the provision of a system in which a continuous groove circumscribes the front plate of the revolving head, and a multiplicity of oil ducts operatively connect the internal bearing surface of each spindle bearing to the circumscribing groove. The system also includes means for supplying an air suspension of lubricant under pressure, which communicates with the circumscribing groove of the head through a passage in the housing in which the head is mounted. The mechanism is substantially devoid of means providing mechanical seals between the revolving head and the housing, as well as between the spindles and their bearings.

The improvement is applied to greatest advantage in mechanisms in which the spindles reciprocate linearly on their axes of rotation, which will normally be equiangularly spaced and parallel to the axis of head rotation. Most desirably, the mechanism will be employed in an automatic screw machine, commonly having five spindles.

In particularly preferred embodiments the revolving head will be so constructed as to promote migration of the air suspension (e.g., oil mist, or aerosol) forwardly from between the contacting bearing surfaces. This will effectively be achieved by forming the circumferential groove of the front plate of the head with a forward wall surface that merges gradually with the adjacent bearing surface, and a rearward wall surface that is generally annular and that intersects angularly with the bearing surface of the plate, thus creating turbulence having a direction sense. The revolving head will usually have back plate as well as a front plate, with the corresponding portion of the housing having spindle bearings and lubricating and sealing features corresponding to those present in the forward parts of the mechanism.

Other objects of the invention are attained by the provision of a machine into which is incorporated the improved mechanism hereof.

BRIEF DESCRIPTION OF THE DRAWINGS

FIG. 3 is a sectional view taken along line 3—3 of FIG. 2, drawn to a further enlarged scale and showing in phantom line and full line two alternative, axially shifted positions of the spindle;

FIG. 4 is a fragmentary edge view of the front plate of which the mechanism is comprised; and FIG. 5 is a fragmentary sectional view taken along line 5—5 of FIG. 4 and drawn to a further enlarged scale.

DETAILED DESCRIPTION OF THE PREFERRED AND ILLUSTRATED EMBODIMENTS

Figure 1:
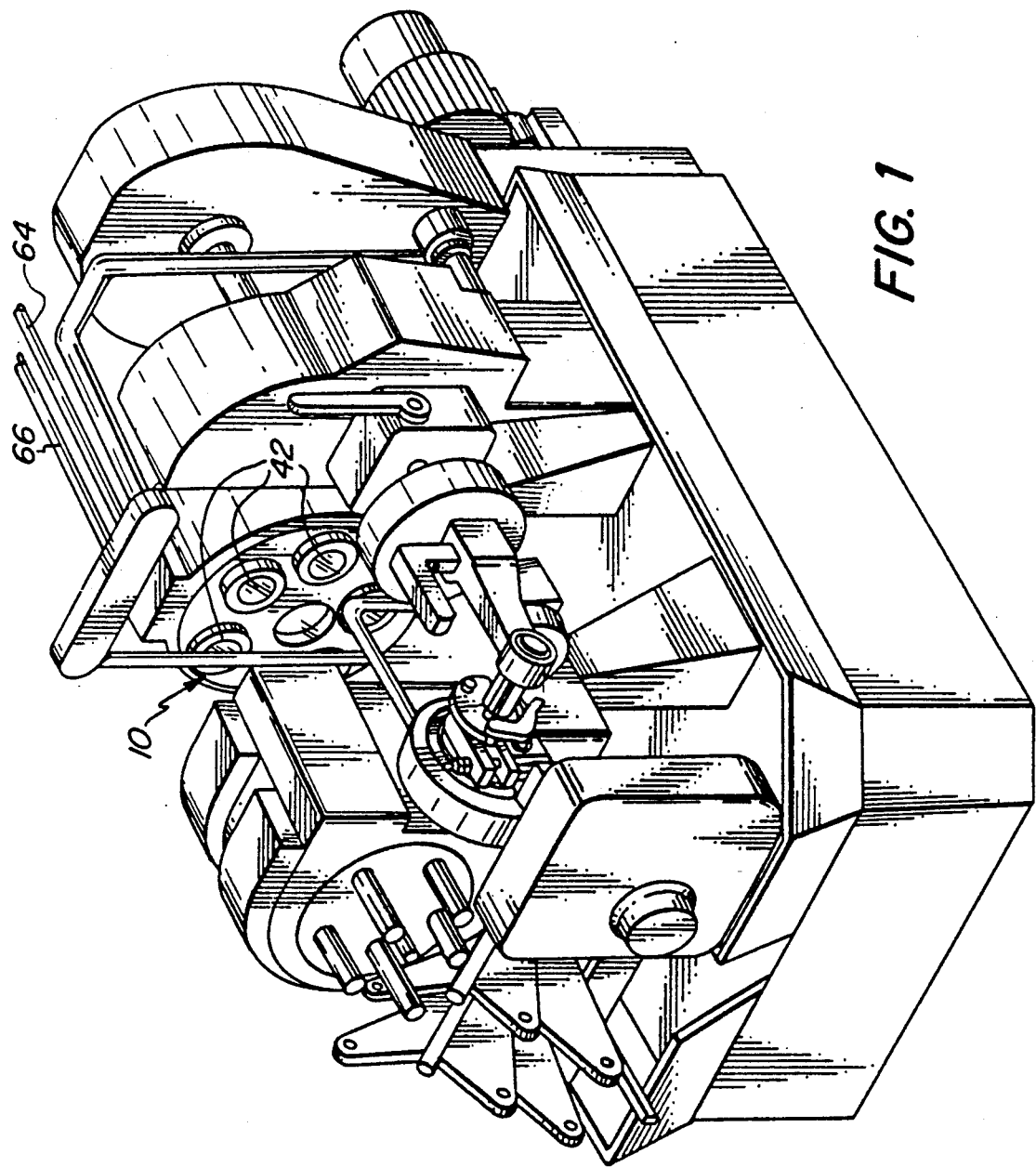
FIG. 1 is a perspective, schematic view of a five-spindle automatic screw machine embodying the invention and incorporating the mechanism hereof.

Turning now in detail to the appended drawings, FIG. 1 depicts the mechanism of the invention (only the revolving head of which is visible) installed in a five-spindle automatic screw machine, for which application it is particularly well-adapted. Such machines are commercially available from Davenport Machine Tool Co., Inc. of Rochester, N.Y., among others.

Figure 2:
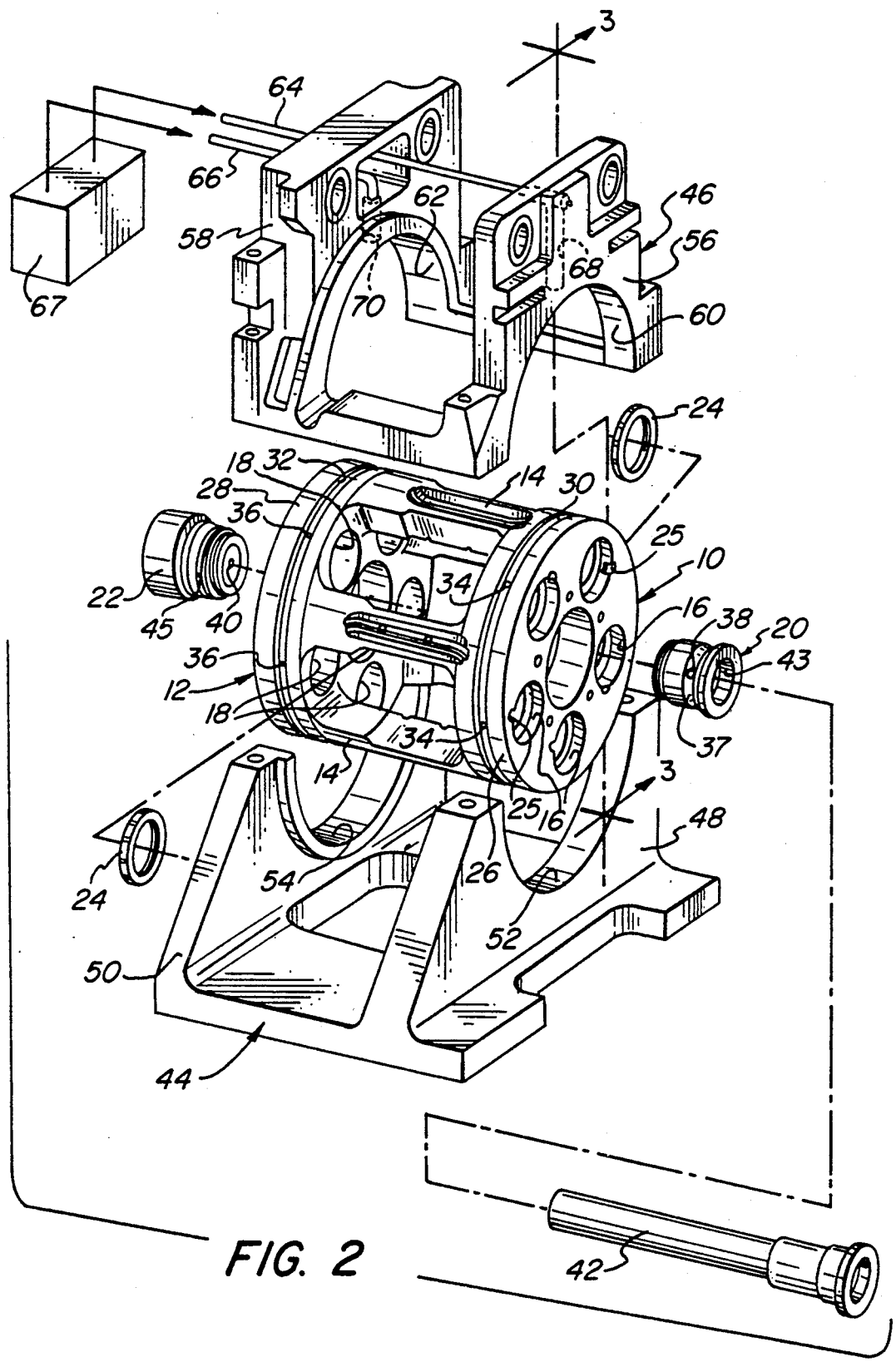
FIG. 2 is an exploded perspective view of the mechanism of the invention, drawn to a scale enlarged from that of FIG. 1.

As best seen in FIG. 2, the revolving head consists of a front plate, generally designed by the numeral 10, and a back plate generally designated by the numeral 12, connected in spaced relationship by five ribs 14. The plates 10, 12 are coaxial and of the same diameter, and are formed with axially aligned openings 16, 18 in which are seated bearing assemblies generally designated by the numerals 20 and 22. The assemblies 20, 22 are secured in place by retention nuts 24, and they carry radial roll pins (not seen) which are received in notches 25 along the edges of the openings 16, 18 to affix the assemblies against rotation relative to the plates 10, 12. Bearing surfaces 26 and 28 circumscribe the front plate 10 and back plate 12, respectively, into which surfaces are formed continuous grooves 30, 32. Five ducts 34, 36 extend radially from each of the grooves 30 and 32 and open at the surfaces that define each of the openings 16 and 18.

The bearing assemblies comprise generally cylindrical outer bodies and internal bushings; FIG. 3 shows the body 21 and bushing 23 of the assembly 20. A groove 37 circumscribes the exterior surface of body 21, from which extends a port 38; an aligned port 39 passes through the bushing 23 and opens into groove 41 circumscribing its inside surface 43. The bodies of the bearing assemblies 22 similarly have circumferential grooves 45 with connecting ports 40, which (it will be appreciated) also lead to the internal bearing surfaces thereof.

Although not visible in FIG. 1, the revolving head of the mechanism is mounted in the machine by a housing that consists of a base 44 and an upper frame 46, normally secured in assembly (by means not illustrated) with the head journaled therebetween. For that purpose, the base 44 has a forward wall portion 48 and a rearward wall portion 50, which have semicircular bearing surfaces 52, 54 formed thereon, respectively. Similarly, the upper frame 46 has a forward portion 56 and a rearward portion 58, with respective semicircular bearing surfaces 60 and 62.

Two tubes 64 and 66 lead from an air/oil supply system 67 to passages 68, 70 in the forward and rearward portions 56, 58 of the upper frame 46. FIG. 3 shows the passage 68 in the forward upper frame portion 56 in registry with, and opening to, the circumferential groove 30 of the front plate 10; it also shows the duct 34 in registry with the groove 37 of the bearing assembly body 21.

As will be readily appreciated, a mist of oil introduced under pressure into the tube 64 will flow through the passage 68, distributing oil over the bearing surfaces 26, 52, 60. As indicated by the small arrows, to the extent that sufficient clearance exists air (with or without entrained oil) will also pass outwardly from therebetween, thus forming a seal that effectively prevents the entry of debris and other foreign matter thereinto from the machining zone adjacent the forward end of the spindles 42. At the same time, lubricant will distribute along the circumferential groove 30, and will pass therefrom through the duct 34 of the plate 10, entering the groove 37, flowing through the ports 38, 39, and exiting into the groove 41 to distribute over the interior surface 43 of the bushings 23. The contacting surfaces of the spindle 42 will thereby be lubricated, and air seals (indicated by the small arrows) will be established thereat as well.

Migration of the oil mist in the forward direction is promoted by the profile of the circumferential groove 30 of the plate 10. As best seen in FIG. 5, the groove is formed with opposing forward and rearward wall surfaces, 30', 30", respectively. Surface 30' merges gradually (i.e., by virtue of being a radius edge) with the circumferential bearing surface 26; in contrast, the opposing, generally annular rearward wall surface 30" intersects angularly with the surface 26. The resultant profile creates eddy-like turbulence in the oil suspension, inducing therein a forward directional sense and thereby favoring discharge into the machining zone. The technique has been found to be highly effective despite axial reciprocation of the spindle 42, which action would otherwise have a tendency to drag foreign matter into the space between the confronting bearing surfaces.

It will be appreciated that the groove 36 in the back plate 12 will serve a similar function, but that because no machining operations are carried in that vicinity there is no need to favor flow to one side or ther other. Accordingly, the back plate 12 will desirably be formed with two circumferential grooves having features that promote outward movement in opposite directions, to thereby ensure efficient lubrication over the full width of the bearing surfaces 28, 54, 62; means for distributing the oil mist to both grooves will of course also be provided.

Thus, it can be seen that the present invention provides a multiple-spindle mechanism, and a machine incorporating the same, in which lubrication and sealing of mating bearing surfaces are improved. The spindles are lubricated simultaneously and continuously, and debris and other foreign matter is effectively excluded despite axial reciprocation of the spindles and despite the absence of mechanical seals. As a result, the need for boring and banding, and for making other major overhauls and repairs to the machine and the revolving head, are greatly reduced or virtually eliminated. There is no need for recovery and recirculation of oil, lubrication is effected without flooding, and the mechanism is of relatively incomplex design and especially well suited for use in an automatic screw machine.

Having thus described the invention, what is claimed is:

1. In a multiple-spindle mechanism, including a housing having a forward journal portion with a circular internal bearing surface; a revolving head mounted for rotation in said housing, said head comprising a front plate having a circumferential external bearing surface in contact with said internal bearing surface of said housing and defining a machining zone outwardly thereof, and a multiplicity of spindle bearings mounted at locations spaced about said front plate, each of said spindle bearings having a cylindrical internal bearing surface; a multiplicity of spindles, each rotatably mounted in an associated one of said spindle bearings and having a cylindrical external bearing surface in contact with said internal bearing surface of said associated bearing; and means for supplying lubricant substantially between all of said bearing surfaces that are in mutual contact; wherein the improvement comprises a system in which said head has a continuous groove formed into said circumferential external bearing surface of said front plate; said front plate and said spindle bearings have a multiplicity of ducts and ports therein, respectively, operatively connecting said internal bearing surfaces of said spindle bearings to said groove; said housing has a passage therein for communicating with said means for supplying and opening at said circumscribing groove of said head; and said means for supplying is adapted to supply an air suspension of lubricant under pressure to said passage, said mutually contacting bearing surfaces opening to said machining zone, and said head being substantially devoid of means providing mechanical seals for preventing the passage of lubricant into said zone from between said mutually contacting bearing surfaces.

2. The mechanism of claim 1 wherein said spindles and spindle bearings are constructed and assembled for reciprocal axial movement of said spindles in said associated bearings, said spindles being constructed and disposed for holding workpieces forwardly of said front plate.

3. The mechanism of the claim 1 wherein said spindles are disposed at equiangularly spaced locations, with their axes of rotation parallel to the axis of rotation of said head.

4. The mechanism of claim 3 wherein said spindle bearings are fixed against rotation relative to said front plate, and wherein there are five of said spindles and associated bearings.

5. The mechanism of claim 1 wherein said head is constructed to promote migration of the air suspension forwardly between at least certain of said contacting bearing surfaces.

6. The mechanism of the claim 5 wherein said groove is formed with opposing forward and rearward wall surfaces, said forward wall surface merging gradually with said circumferential bearing surface of said front plate, and said rearward wall surface being generally annular and intersecting angularly with said bearing circumferential surface.

7. The mechanism of claim of 1 wherein said housing also has a rearward journal portion with a second circular internal bearing surface coaxial with said first-mentioned circular internal bearing surface; wherein said head has a back plate with a circumferential external bearing surface in contact with said second internal bearing surface, and with a multiplicity of spindle bearings mounted at spaced locations about said back plate, each of said spindle bearings of said back plate having a cylindrical internal bearing surface, and each of said spindles being rotatably mounted in an associated one of said back plate bearings and having a cylindrical external bearing surface in contact therewith, said head having a second continuous groove formed into said circumferential external bearing surface of said back plate; wherein said back plate and said back plate bearings have a second multiplicity of ducts and ports connecting said internal bearing surfaces of said back plate bearings to said second circumscribing groove; and wherein said housing has a second passage therein for communicating with said means for supplying, and opening at said second circumscribing groove of said head, for supplying an air suspension of lubricant under pressure to said second passage.

8. An automatic screw machine including the mechanism of claim 1, said machine having a workpiece machining station disposed in front of said spindles, and being devoid of means for lubricant recirculation.

* * * * *